US006621563B2

(12) United States Patent
DeCusatis et al.

(10) Patent No.: US 6,621,563 B2
(45) Date of Patent: Sep. 16, 2003

(54) APPARATUS AND METHOD FOR IN-SITU VIBRATION TESTING OF FIBER OPTIC CABLES AND CONNECTORS

(75) Inventors: Casimer M. DeCusatis, Poughkeepsie, NY (US); Michael S. Humes, Kingston, NY (US); Budy D. Notohardjono, Poughkeepsie, NY (US); Donald W. Porter, Highland, NY (US); Kenneth A. Scea, Poughkeepsie, NY (US); John H. Fox, Haledon, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/052,340

(22) Filed: Jan. 18, 2002

(65) Prior Publication Data

US 2003/0137651 A1 Jul. 24, 2003

(51) Int. Cl.[7] ............................................. G01N 21/00
(52) U.S. Cl. .................................................... 356/73.1
(58) Field of Search ........................... 356/73.1; 385/88, 385/89, 60, 53, 78, 72, 139, 134, 22, 37, 76; 702/109, 122, 118, 121

(56) References Cited

U.S. PATENT DOCUMENTS

| 4,309,105 A | 1/1982 | Lebduska | 356/73.1 |
| 5,530,546 A | 6/1996 | Barringer et al. | 356/73.1 |
| 5,546,325 A | 8/1996 | Aulet et al. | 364/525 |
| 5,598,360 A | 1/1997 | Bogdan et al. | 364/579 |
| 5,764,348 A | 6/1998 | Bloom | 356/73.1 |
| 5,767,957 A | 6/1998 | Barringer et al. | 356/73.1 |
| 6,108,074 A | 8/2000 | Bloom | 356/73.1 |
| 6,177,985 B1 | 1/2001 | Bloom | 356/73.1 |

OTHER PUBLICATIONS

Abrams, Michelle; "Computer Graphics World—Graphics, 3–D Modeling, Cad and Visual Computing," downloaded from web at http://cgw.pennet.com/Articles/Article_Display.cfm?Section=Archives&Subsection; pp. 1–3.
Lord, Bryan; "Bringing Bit–Error–Rate Testing Up to Speed," downloaded from web at http://www.chipcenter-.com;TestandMeasurement/tn030.html?PRINT=true; pp. 1–3.
"New Generation Fiber Optic Connectors—Let The Market Decide!" downloaded from web at http://www.cableu.net/fibrtech/sff_conn.thm; pp. 1–5.
"FOTEC Application Note—Testing Duplex Sff Connectors," downloaded from web at http://www.cableu.net/fibrtech/sfftest.htm; pp. 1–4.
"Fiber Optic Cable Test FOTP–171 & Fiber Optic Cable Plant Test OFSTP–14," downloaded from web at http://fotec.com/ofstp171.htm and http://fotec.com/ofstp14.htm.

Primary Examiner—Frank G. Font
Assistant Examiner—Tu T. Nguyen
(74) Attorney, Agent, or Firm—Floyd A. Gonzalez; Cantor Colburn LLP

(57) ABSTRACT

An apparatus for performing vibration testing of fiber optic components is disclosed. In an exemplary embodiment, the apparatus includes a base member and a mounting assembly for holding a plurality of connectors therein, The plurality of connectors optically couple a plurality of fiber optic cables with one another in a serial configuration. In addition, a securing mechanism for adjustably secures the mounting assembly in a selected axial orientation with respect to the base member, wherein the mounting assembly allows simultaneous vibration testing of each of the plurality of connectors.

13 Claims, 2 Drawing Sheets

APPARATUS AND METHOD FOR IN-SITU VIBRATION TESTING OF FIBER OPTIC CABLES AND CONNECTORS

BACKGROUND

The present disclosure relates generally to optical fiber component testing and, more particularly, to an apparatus and method for in-situ vibration testing of fiber optic cables and connectors.

Entities presently engaged in the manufacture and use of communication systems (e.g., voice, video and/or data communication), have become increasingly interested in using fiber optic cables as transmission media in such systems. This interest is stimulated in part by the fact that the potential bandwidth (i.e., information-carrying capacity) of optical fibers is extremely high. In addition, communication systems employing fiber optic cables are resistant to electromagnetic interference, which sometimes plagues systems employing electrical cables as transmission media. Moreover, communication systems employing fiber optic cables are generally considered more secure than systems employing electrical cables because it is typically more difficult for unauthorized personnel to tap or access a fiber optic cable without being detected.

As is the case with electrical cable, connector technology is also an important aspect of fiber optic communication systems. For example, conventional duplex fiber optic connectors (such as SC Duplex connectors) provide for the alignment of optical fibers by threading each fiber through a precision ceramic ferrule. The two ferrules of an SC connector have an outer diameter of about 2.5 millimeters (mm), and the resulting fiber-to-fiber spacing (or pitch) of a duplex connector is approximately 12.5 mm. Since the outer of the fiber captured by the ferrule is only about 125 microns ($\mu$m), it is possible to design a significantly smaller optical connector having fewer precision parts in order to reduce manufacturing costs.

Recently, a new class of small form factor (SFF) fiber optic connectors has been introduced with the goal of reducing the size of a fiber optic connector to one half of that of a standard SC Duplex connector while maintaining or reducing the cost. Several different designs have been proposed by different manufacturers, including the SC-DC or SC-QC (by IBM and Siecor), the LC (manufactured by Lucent Technologies and others), the MT-RJ (manufactured by Fujikura, Siecor and AMP and others), and VF-45.

A communication system employing fiber optic cables, connectors, electro-optic modules and other associated components can only operate effectively if the components are in conformity with corresponding operating specifications. Qualification testing is thus implemented to determine whether the various components conform to their respective specifications, as well as to detect and correct errors in manufacturing processes which lead to any non-conformities in the components. In particular, a part of the qualification testing of SFF fiber optic connectors includes vibration testing for determining the connector robustness in high reliability applications.

Under existing IBM and Bellcore standards, vibration testing is presently implemented for SFF fiber optic connectors on an individual basis using a series of set parameters. These parameters, which include both random and operating vibration, involve plugging and cycling each connector individually through a series of tests lasting from about 15 minutes to about 1 hour per test axis. As with any qualification test procedure, however, those engaged in the development and manufacture of fiber optic communication systems have long sought systems and methods for testing components which require relatively short testing times and which also better simulate actual system performance.

BRIEF SUMMARY

The above discussed and other drawbacks and deficiencies of the prior art are overcome or alleviated by an apparatus for performing vibration testing of fiber optic components. In an exemplary embodiment, the apparatus includes a base member and a mounting assembly for holding a plurality of connectors therein, The plurality of connectors optically couple a plurality of fiber optic cables with one another in a serial configuration. In addition, a securing mechanism adjustably secures the mounting assembly in a selected axial orientation with respect to the base member, wherein the mounting assembly allows simultaneous vibration testing of each of the plurality of connectors.

In one embodiment, the mounting assembly further includes a generally planar sheet member, a flange member extending from the sheet member, and an optical coupling assembly inserted within the sheet member. The optical coupling assembly secures the plurality of connectors therein. An input device is used for transmitting a test signal through the fiber optic cables and the plurality of connectors, while an output measuring device is used for measuring the transmitted test signal. The output measuring device is preferably capable of displaying a localized, visual output of the transmitted test signal.

In a preferred embodiment, the input device includes a pattern generator configured as a bit error rate tester, and the output measuring device further includes a digital sampling oscilloscope. A plurality of optical couplers is configured within the optical coupling assembly, each of the plurality of optical couplers providing optical coupling between a given pair of connectors.

BRIEF DESCRIPTION OF THE DRAWINGS

Referring to the exemplary drawings wherein like elements are numbered alike in the several Figures.

DETAILED DESCRIPTION

Referring generally to the Figures, there is shown an apparatus 10 for performing vibration testing of fiber optic components, in accordance with an embodiment of the invention. Broadly stated, the apparatus 10 provides for the simultaneous, in-situ vibration testing of a number of optical connectors connected (through optical cables) in a serial or "daisy chained" configuration. Thereby, a time savings is realized over conventional, one connector at a time testing techniques. In addition, the apparatus 10 also permits bit error rate (BER) testing to be accomplished concurrently with the vibration testing, as is described hereinafter.

Figure 1:
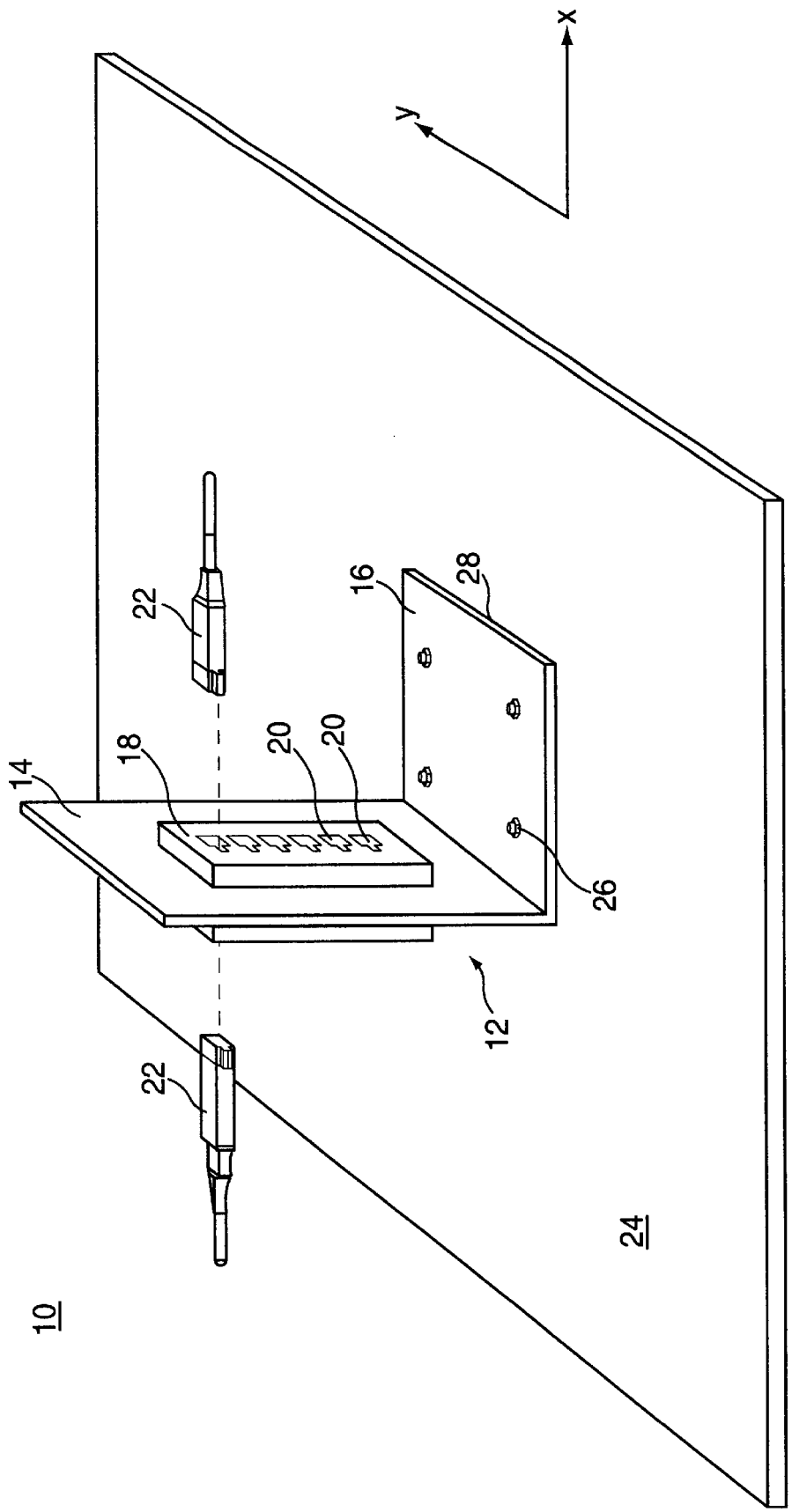
FIG. 1 is a perspective view of an apparatus for performing vibration testing of fiber optic components, in accordance with an embodiment of the invention.
Figure 2:
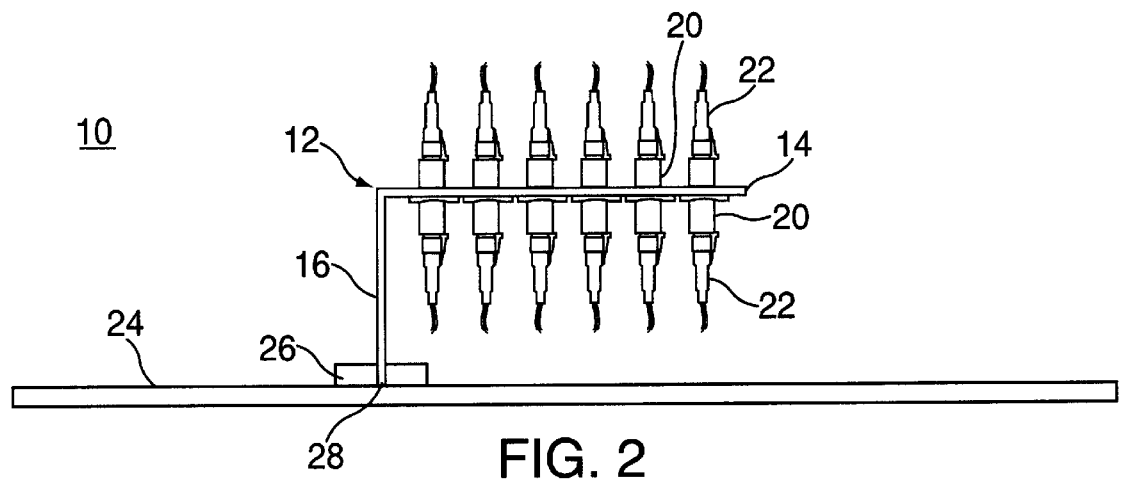
FIG. 2 is a side view of the apparatus of FIG. 1, illustrating the mounting assembly secured such that longitudinal axes of optical connectors connected thereto are perpendicular to the vibration table.

Referring more specifically to FIG. 1, apparatus 10 includes a mounting assembly 12 having a generally planar sheet member 14 and a flange member 16 extending generally perpendicularly from the sheet member 14. Both the sheet member 14 and the flange member 16 may be formed from a suitable material such as sheet metal, and may comprise a unitary sheet. Inserted within the sheet member 14 is an optical coupling assembly 18 having a plurality of optical couplers 20 therein. The optical couplers 20 are adapted to matingly receive a pair of corresponding optical connectors 22 therein, one at each end thereof. Although the optical coupling assembly 18 is preferably adapted to secure small form factor (SFF) optical connectors for the testing thereof, it will be appreciated that the principles of the present invention embodiments may also be applied to larger optical connectors, as well as electrical connectors. In addition, although the optical coupling assembly 18 in FIG. 1 is depicted as a single, "block" assembly with multiple optical couplers 20 formed therein, it should be understood that an equivalent optical coupling assembly could also be fashioned by inserting and securing a number of individual optical couplers directly into the sheet member 14, as shown in FIGS. 2 and 3.

The flange member 16 is used to secure the mounting assembly 12 to a base member 24, which is preferably a vibration table for applying a test vibration motion to the mounting assembly 12 and thus to the optical connectors 22 attached thereto. The flange member 16 may be secured to the base member 24 by bolts (FIG. 1), screws, clamps, vises (FIG. 2) or other suitable securing mechanism 26. Moreover, the securing mechanism 26 is preferably capable of securing the mounting assembly 12 in a variety of selected axial orientations for testing. For example, FIG. 1 illustrates the mounting assembly 12 secured in a manner such that the longitudinal axes of each pair of optically coupled connectors 22 is parallel to the x-axis of an x-y plane defined by the top surface of the base member 24. However, the mounting assembly 12 may also be rotated and secured such that the longitudinal axes of each pair of connectors 22 is parallel to the y-axis. Further, by pivoting the mounting assembly 12 and securing the edge 28 of flange member 16 to the base member 24, the longitudinal axes of each pair of connectors 22 are perpendicular to the x-y plane, as shown in FIG. 2.

Figure 3:
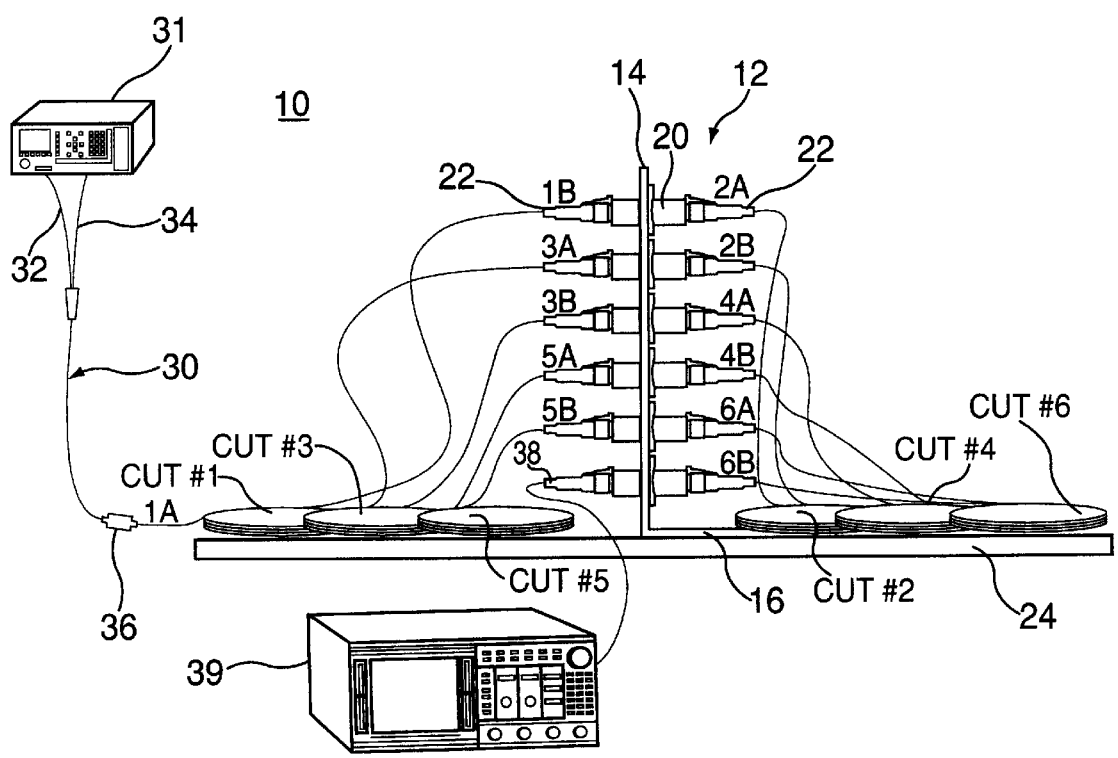
FIG. 3 is a schematical side view of the apparatus configured in an exemplary test configuration.

Referring now to FIG. 3, apparatus 10 is schematically illustrated in an exemplary test configuration. An interface cable 30 provides an interface between a test input device 31 (e.g., a pattern generator or BER tester) and the connectors, optical couplers and fiber optic cables under test. The interface cable 30 preferably includes an input lead 32 that carries the signal inputted from the BER tester and an output lead 34 from the BER tester. A connector 36 is used to provide an optical connection from the interface cable 30 to a first fiber optic cable CUT#1 at connection 1A. The other end of cable CUT#1 is connected (at connection 1B) to one of the SFF connectors 22 under test which, in turn, is optically coupled to another SFF connector 22 (at connection 2A) through optical coupler 20. A serial optical path is continued through a second fiber optic cable CUT #2 to another pair of SFF connectors 22 at connections 2B and 3A. The optical test path thus continues sequentially through the remaining fiber optic cables, SFF connectors and optical couplers, until terminating at an optical wrap plug 38. An output monitoring device 39, such as a digital sampling oscilloscope (DSO) may be connected to plug 38 so as to provide in-situ monitoring of BER test performance by monitoring output waveform eye patterns. Finally, control of the in-situ vibration testing process may be controlled and monitored by a personal computer (PC) or other software controlled workstation.

The advantages of implementing the above described apparatus 10 in conjunction with both vibration and BER testing become apparent upon a comparison with existing methods. First, as stated previously, current specifications for vibration testing of SFF connectors dictate that individual connectors be individually plugged in and cycled. Typically, this involves a series of vibration tests conducted at several frequencies and durations, and thereafter repeated for different axial orientations. The BER testing or other signal attenuation testing may then be performed separately after each set of vibration tests. Such testing may take anywhere from about 15 minutes to 1 hour per axial orientation. In contrast, the present apparatus 10 allows for the simultaneous, in-situ vibration testing of a number of optical connectors, thereby resulting in a significant time savings.

In addition, the ability of apparatus 10 to be used in conjunction with the BER/DSO test method allows for a more realistic measurement of actual connector and system performance. For example, the BER tester 31 may apply a long, pseudo-random bit sequence (PBRS) of $2^{31}-1$ bits to the series of connectors under test while, at the same time, mounting assembly 12 (with connectors affixed thereto) is subjected to the test vibrations. Still a further advantage stems from the fact that apparatus 10 and the associated test methodologies result in a reduced handling of the connectors themselves which might otherwise affect the test results.

While the, invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for performing vibration testing of fiber optic components, the apparatus comprising:
   a base member;
   a mounting assembly for holding a plurality of connectors therein, said plurality of connectors optically coupling a plurality of fiber optic cables with one another in a serial configuration; and
   a securing mechanism for adjustably securing said mounting assembly in a selected axial orientation with respect to said base member;
   wherein said mounting assembly allows simultaneous vibration testing of each of said plurality of connectors.

2. The apparatus of claim 1, wherein said mounting assembly further comprises:
   a generally planar sheet member;
   a flange member extending from said sheet member; and
   an optical coupling assembly inserted within said sheet member, said optical coupling assembly for securing said plurality of connectors therein.

3. The apparatus of claim 1, further comprising:
   an input device for transmitting a test signal through said fiber optic cables and said plurality of connectors; and
   an output measuring device for measuring said transmitted test signal, said output measuring device capable of displaying a localized, visual output of said transmitted test signal.

4. The apparatus of claim 3, wherein said input device comprises a pattern generator, said pattern generator being configured as a bit error rate tester.

5. The apparatus of claim 3, wherein said output measuring device further comprises a digital sampling oscilloscope.

6. The apparatus of claim 2, wherein said mounting assembly further comprises:

a plurality of optical couplers, configured within said optical coupling assembly, each of said plurality of optical couplers for providing optical coupling between a given pair of said plurality of connectors.

7. The apparatus of claim 6, wherein said plurality of connectors comprise small form factor connectors.

8. A method for performing vibration testing of fiber optic components, comprising:

configuring a plurality of connectors within a mounting assembly, said plurality of connectors optically coupling a plurality of fiber optic cables with one another in a serial configuration;

adjustably securing said mounting assembly in a selected axial orientation with respect to a base member; and applying, through said base member, a vibration motion to said mounting assembly and said plurality of connectors configured therein.

9. The method of claim 8, wherein said mounting assembly further comprises:

a generally planar sheet member;

a flange member extending from said sheet member; and an optical coupling assembly inserted within said sheet member, said optical coupling assembly for securing said plurality of connectors therein.

10. The method of claim 8, further comprising:

configuring an input device for transmitting a test signal through said fiber optic cables and said plurality of connectors; and configuring an output measuring device for measuring said transmitted test signal, said output measuring device capable of displaying a localized, visual output of said transmitted test signal.

11. The method of claim 10, wherein said input device comprises a pattern generator, said pattern generator being configured as a bit error rate tester.

12. The method of claim 10, wherein said output measuring device further comprises a digital sampling oscilloscope.

13. The method of claim 9, wherein said mounting assembly further comprises:

a plurality of optical couplers, configured within said optical coupling assembly, each of said plurality of optical couplers for providing optical coupling between a given pair of said plurality of connectors.

* * * * *